United States Patent [19]

Pingaud

[11] Patent Number: 4,798,622

[45] Date of Patent: Jan. 17, 1989

[54] PREPARATION OF FACETTED NODULAR PARTICLES

[75] Inventor: Bernard J. Pingaud, Vincennes, France

[73] Assignee: Eastman Kodak Company, Rochester, N.Y.

[21] Appl. No.: 6,656

[22] PCT Filed: Feb. 1, 1986

[86] PCT No.: PCT/EP86/00052

§ 371 Date: Oct. 8, 1986

§ 102(e) Date: Oct. 8, 1986

[87] PCT Pub. No.: WO86/05026

PCT Pub. Date: Aug. 28, 1986

[30] Foreign Application Priority Data

Feb. 19, 1985 [FR] France .............................. 85400284.7

[51] Int. Cl.$^4$ .................................................. C01G 49/06
[52] U.S. Cl. ............................. 75/0.5 AA; 75/0.5 BA; 252/62.56; 423/632; 423/633; 423/634
[58] Field of Search .................... 423/632, 633, 634; 252/62.56; 75/0.5 AA, 0.5 BA

[56] References Cited

U.S. PATENT DOCUMENTS

| | | | |
|---|---|---|---|
| 3,267,041 | 8/1966 | MacCallum | 423/633 |
| 4,101,311 | 7/1978 | Aonuma et al. | 75/0.5 AA |
| 4,113,521 | 9/1978 | Bush et al. | 75/0.5 AA |
| 4,382,822 | 5/1983 | Mayer | 252/62.56 |

FOREIGN PATENT DOCUMENTS

| | | | |
|---|---|---|---|
| 44-9730 | 5/1969 | Japan | 423/633 |
| 50-51498 | 5/1975 | Japan | 423/633 |
| 61-39509 | 2/1986 | Japan | 423/634 |

*Primary Examiner*—Jack Cooper
*Attorney, Agent, or Firm*—Bernard D. Wiese

[57] ABSTRACT

Very small iron-containing particles that are in the shape of facetted nodules. Such particles can be non-magnetic particles such as delta ferric oxide hydrate particles or magnetic particles such as magnetic iron oxide particles or metallic particles. Magnetic layers containing such magnetic particles combine excellent remanent magnetization with increased output signal level. The facetted nodular particles are prepared in a process in which (a) an aqueous solution of ferrous salt is added to an aqueous solution of alkaline hydroxide while avoiding substantial local excesses of the ferrous salt, and subjecting the ferrous salt solution to reducing conditions before or during its addition to the alkaline hydroxide solution and (b) the ferrous hydroxide particles are oxidized to delta ferric oxide hydrate particles in the presence of an iron complexing agent, for example, pyrogallol, that is capable of selectively forming ferric iron complexes that are soluble in the reaction medium. The use of the iron complexing agent in this process provides delta ferric oxide particles rather than alpha ferric oxide particles which are normally obtained in processes of this type. The delta ferric oxide hydrate particles are converted to facetted nodular magnetic particles by appropriate heat treatments.

8 Claims, 7 Drawing Sheets

PREPARATION OF FACETTED NODULAR PARTICLES

TECHNICAL FIELD

This invention relates to magnetic recording and provides particles that are particularly useful in that field. In one aspect, this invention relates to a process for preparing non-magnetic particles of delta ferric oxide hydrate that are in the shape of facetted nodules and can be used as precursors for similarly shaped magnetic particles. In another aspect, this invention relates to magnetic iron oxide particles such as gamma ferric oxide magnetic particles and solid solution magnetic particles or metallic magnetic particles and their preparation from such precursors. The facetted nodular magnetic particles exhibit properties that make the very useful in high performance magnetic recording layers, particularly high performance isotropic recording layers.

BACKGROUND ART

An isotropic magnetic recording layer is a magnetic layer having substantially the same coercivities and remanent intensities of magnetization measured in three orthogonal directions, e.g. along X, Y and Z axes. Pinguad U.S. Pat. No. 4,451,535, issued May 29, 1984 describes magnetic recording elements comprising isotropic magnetic recording layers. As shown in that patent, such elements exhibit improved magnetic properties such as information storage capacity, intensity of remanent magnetization and increased signal output at short wavelengths, in comparison to comparable prior art elements.

Pinguad U.S. Pat. No. 4,376,714, issued Mar. 15, 1983, describes a process for preparing acicular particles of magnetic iron oxide. In that process, acicular alpha ferric oxide hydrate particles are prepared by adding a ferrous salt solution to an alkaline hydroxide solution to form an aqueous solution of ferrous hydroxide particles and oxidizing such particles; the ferrous salt solution being submitted to reducing conditions before or after the addition of the alkaline hydroxide solution. That patent discloses that the excess of alkaline hydroxide used can be between 50 and 250 percent. The process described in that patent, including appropriate heat treatments of the alpha ferric oxide hydrate particles, provides acicular iron oxide magnetic particles having an average length shorter than 0.3 micrometer e.g. about 0.15 to 0.2 micrometer and an acicularity between 2 and 8. Such magnetic particles can be used to form isotropic magnetic recording media.

As disclosed hereinafter, a process of the type described in Pinguad U.S. Pat. No. 4,376,714 can be modified by oxidizing the ferrous hydroxide particles in the presence of a specified class of iron complexing agents to provide magnetic particles that are particularly useful in forming isotropic magnetic recording media. Such use of the complexing agents alters the crystalline form and the shape of the ferric oxide hydrate particles to provide a novel precursor for the preparation of the magnetic particles. This will be discusssed in greater detail hereinafter.

There is a continuous endeavor in the magentic recording art to increase the signal to noise ratio of magnetic recording elements. One means used to increase this ratio is to reduce the background noise of magnetic layers. It is known that such noise is related to the size of the particles used for preparing the magnetic layers. Accordingly, it is desirable to provide magnetic particles that are as small as possible in order to obtain magnetic recording elements having an improved signal to noise ratio. One objective of this invention is to provide very small particles having excellent magnetic recording/reproducing properties.

DISCLOSURE OF INVENTION

This invention provides particles that are magnetic or non-magnetic, comprise iron, have the shape of facetted nodules and an average diameter up to 0.05 micrometer. The non-magnetic particles provided by this invention are delta ferric oxide hydrate particles. Such delta ferric oxide hydrate particles are precursors for the magnetic particles of this invention.

This invention also provides a magnetic recording element, preferably an isotropic magnetic recording element comprising a support and at least one layer containing the facetted nodular magnetic particles described herein.

This invention also provides a process for preparing facetted nodular particles comprising (a) adding an aqueous solution of ferrous salt to an aqueous solution of alkaline hydroxide while avoiding substantial local excesses of the ferrous salt, and subjecting the ferrous salt solution to reducing conditions before or during the addition thereof to the alkaline hydroxide solution, to thereby form an aqueous dispersion of ferrous hydroxide particles, and (b) oxidizing the ferrous hydroxide particles, to thereby form delta ferric oxide hydrate particles, the oxidizing being in the presence of an iron complexing agent that is capable of selectively forming ferric iron complexes that are soluble in the reaction medium.

BEST MODE OF CARRYING OUT THE INVENTION

In practicing this invention, precursor particles of delta ferric oxide hydrate of very small size can be initially prepared and converted by appropriate heat treatments to magnetic iron oxides or magnetic metallic particles useful for preparing magnetic recording media, particularly media having improved isotropy. Unlike conventional prior art particles that have a shape that is, for example cubic or acicular, the iron-containing particles of this invention have a shape that is nodular and facetted. Such particles generally are irregularly shaped masses and have six or more faces, as can be observed from the electron micrographs in FIGS. 1 and 3. Specifically, the process of the invention provides facetted nodule-shaped, delta ferric oxide hydrate particles of very small size that, by conventional heat treatments, can provide similarly shaped magnetic iron oxide particles or magnetic metallic particles that can be used to form isotropic magnetic recording elements.

In the process for preparing delta ferric oxide hydrate according to the invention, an iron selective complexing agent is introduced into the reaction medium. This agent is soluble in the reaction medium and is capable of forming with ferric ion, complexes that the soluble under the alkaline pH conditions of the reaction medium. This complexing agent apparently functions to modify the mechanism of oxidation since it is effective to provide facetted nodular delta ferric oxide hydrate particles upon oxidation of ferrous hydroxide particles rather than forming the acicular alpha ferric oxide hydrate particles described, for example, in Pinguad U.S. Pat. No. 4,376,714, issued Mar. 15, 1983. Due to the presence of this complexing agent, the mechanism of the oxidation reaction is obviously quite different.

In conventional prior art processes of preparing acicular alpha ferric oxide hydrate particles the nuclei apparently originate from solution by an ionic process and then grow epitaxially with the concurrent dissolution of ferrous hydroxide grains, by oxidation of $Fe^{++}$ ions in the presence of $OH^-$ ions in the liquid phase. The electron micrographs of FIG. 2 clearly show the appearance of the first small needles of alpha ferric oxide hydrate separate from the ferrous hydroxide grains and then their growth while the ferrous hydroxide grains dissolve completely and disappear.

Figure 1:
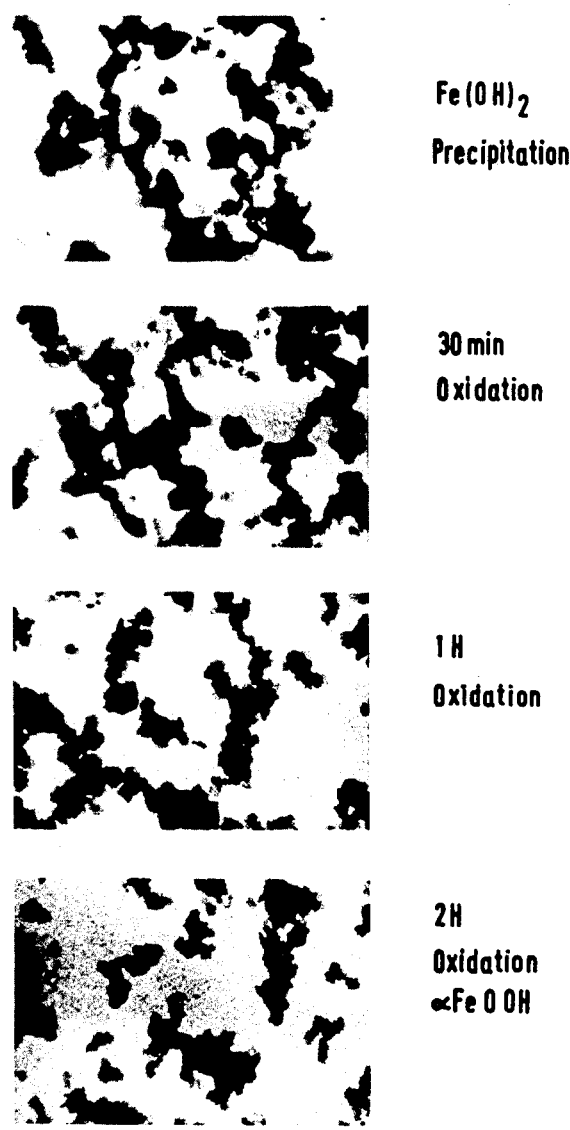
FIG. 1 is a series of electron micrographs (magnification 100,000 X) depicting the formation of facetted nodular delta ($\delta$) ferric oxide hydrate particles according to the invention.

In contrast, in the process according to the invention, the ferrous hydroxide is directly oxidized in a solid phase into delta ferric oxide hydrate without any apparent modification of the shape of the particles. The electron micrographs in FIG. 1 show the conversion of the ferrous hydroxide particles to delta ferric oxide hydrate particles, in the process of this invention. It is thought (without this interpretation constituting a limitation of this invention) that the complexing agent present in the reaction medium at the time of the oxidation of ferrous hydroxide considerably lowers the concentration in the solution of free $Fe^{+++}$ ions, which free ions would separately nucleate to form alpha ferric oxide hydrate acicular particles. The complexing agent blocks the formation of a substantial amount of $Fe^{+++}$ ions in solution. Regardless of the exact mechanism of the reaction, this is the reason why the complexing agent is considered to be responsible to the modification of the particle growth in the process of this invention.

Figure 7:
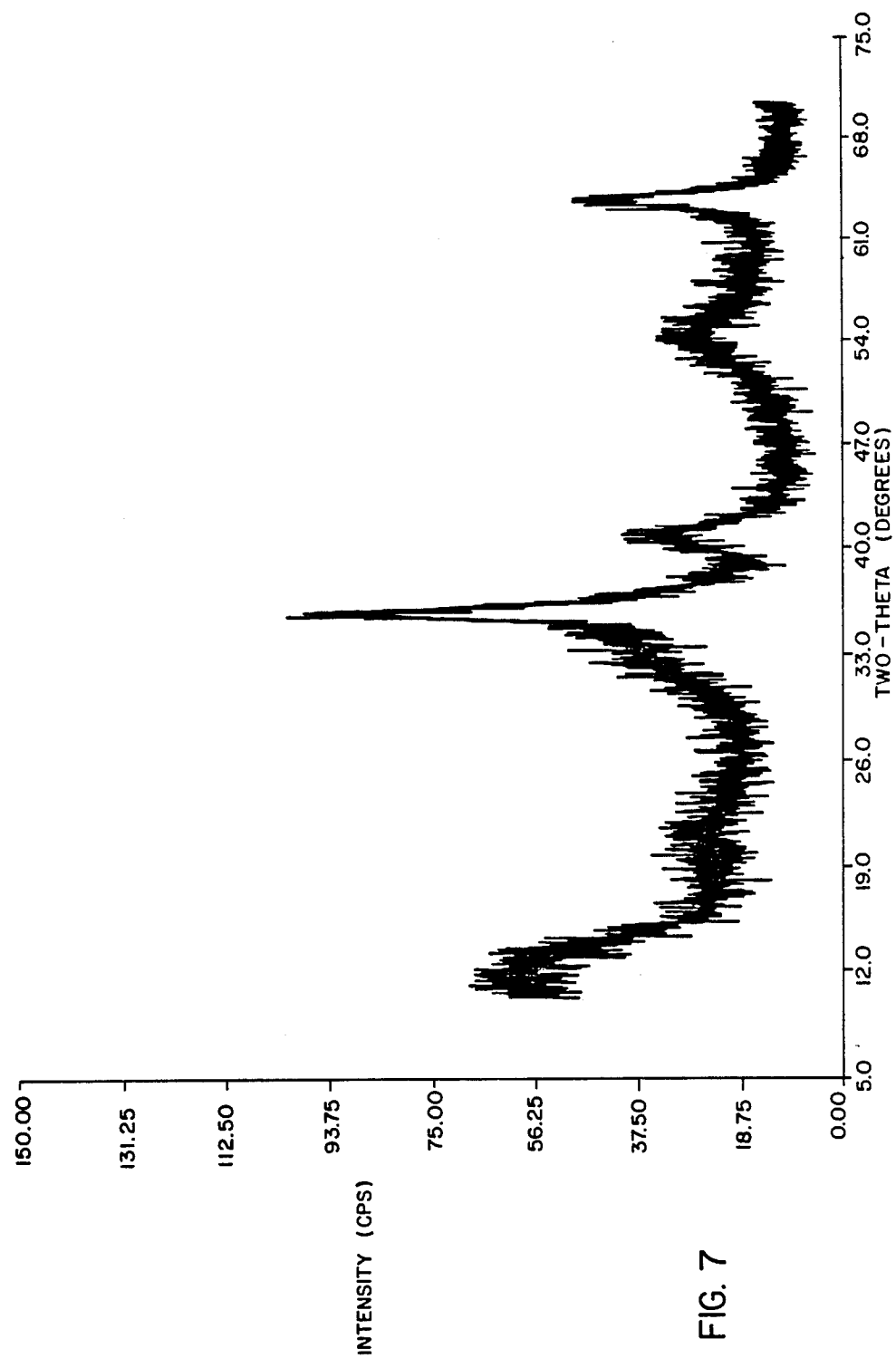
FIG. 7 is an x-ray diffractogram for the delta ferric oxide hydrate of this invention in which intensity in Counts Per Second (CPS) is plotted against $2\theta$ (Degrees).

The ferric oxide hydrate particles of this invention were identified as having the delta ferric oxide hydrate crystalline form by X-ray powder diffraction which is a well-known analytical technique. The technique is described in several textbooks including "X-RAY DIFFRACTION PROCEDURES, For Polycrystalline and Amorphous Materials", 2nd Edition, by H. P. Klug and L. E. Alexander, John Wiley and Sons, New York, Copyright 1954 and 1974. The X-ray diffractogram illustrated in FIG. 7 is typical for the delta ferric oxide hydrate particles described herein and illustrated in the following Examples. This x-ray diffractogram was made from a powder sample using a Siemens D500 Diffractometer (manufactured by Siemens A.G., Munich, Federal Republic of Germany) equipped with scintillation detector and a diffracted beam graphite monochromotor (Cu K$\alpha$ radiation, wavelength 1.54184 Å). The analyzing slit was a 0.05 degree slit. A step scan of $0.02°$/step, 2 seconds/step was used. The scan range was $10°-70°$ $2\theta$ ($2\theta$=diffraction angle). The interplanar spacings (d-spacings) in the diffractogram matched those of Reference Standard 13-87 of the Joint Committee of Powder Diffraction Standards (JCPDS) for delta ferric oxide hydrate. The crystalline form of alpha ferric oxide hydrate, as described herein for comparison purposes, can be confirmed by conventional x-ray powder diffraction techniques, using, for example, JCPDS Reference Standard 29-718 for comparison. The difference between the two diffractograms can be clearly identified.

It is a significant feature of this invention that the facetted nodular particles prepared as described herein are substantially uniform in size and have a narrow size distribution. This is apparent from the sample distribution depicted in the electron micrograph in FIG. 3. Also, upon inspection of the coercivities reported in the following Examples 12-14 for layers containing magnetic iron oxides and metal particles, it can be seen that magnetic particles of this invention exhibit coercivities that are considerably higher than would be expected for particles of such size, shape and composition. It is also of interest to note that magnetic iron oxide particles having a facetted, nodular shape exhibit coercivities for a given concentration of dopant ion such as cobalt, that exceed the coercivities that one skilled in the art would have predicted. In addition, magnetic particles of this invention are non-elongated and exhibit no significant shape anisotropy. Their unique shape makes these particles particularly useful in forming layers that exhibit an isotropic magnetic response.

It is significant that magnetic particles prepared as described herein have a very low porosity. It is well known that when magnetic particles are prepared from an alpha ferric oxide hydrate precursor in conventional processes involving oxidation of ferrous hydroxide, the final particles are quite porous. Inasmuch as the conversion is conducted in the solid state, the dehydration of the alpha ferric oxide hydrate leaves vacancies in the positions formerly occupied by $OH^-$ and $H^+$ ions, which may remain or be only partially "healed" during subsequent heat treatment. Complete consolidation of the resulting magnetic ferric oxide cannot be achieved without using sufficiently high temperatures and times so as to induce sintering of the particle into a hard agglomerate. Likewise, when the reduction is carried further to the metallic state, there is a further removal of mass from the particles and further generation of porous end products. This porosity can be observed readily in electron micrographs of suitably high magnification and resolution, and can be inferred at lower magnification and resolution by the irregularity of the bounding surfaces. In contrast to comparable prior art particles, the particles obtained by the practice of this invention have no substantial internal or intragranular porosity. This may be demonstrated using a mercury porosimeter, as discussed in detail hereinafter.

The iron selective complexing agent used in the process of this invention is soluble in the reaction medium and is capable of forming ferric iron complexes that are also soluble in the reaction medium. Accordingly, such complexes do not form precipitates in the reaction medium. The "iron selective complexing agent" is selective with respect to ferric ions. It has a much stronger complexing power for ferric ions than for other metallic ions likely to be found in the medium, i.e. this agent forms a complex with ferric ions which complex has a dissociation constant that is much lower than that of any complex which is likely to be formed with other ions present in the medium. For example, a salt of a doping metal such as cobalt, can be introduced into the reaction medium to provide cobalt doped delta ferric oxide hydrate. Obviously the complexing agent should not complex such doping ions.

The complexing agent forms ferric ion complexes soluble in an alkaline medium. A simple polarographic test is effective to identify such useful complexing agents. This test has the advantage that it can be conducted for complexing agents giving colorless complexes as well as for those giving colored complexes. A solution of NaOH N/10 containing 2 g/liter of complexing agent with a convenient concentration of ferric ion, e.g. $10^{-3}$ moles is used. The polarographic measurement is made between 0 and $-2$ V with a saturated Ag/AgCl/KCl electrode. For useful complexes, the half-wave potential of the complex with iron is typically more negative than $-800$ mV. Thus, for example, for gallic acid, there is a half wave potential at $-1530$ mV, for pyrogallol at $-900$ mV and for mannitol at $-900$ mV.

To reduce the content of free $Fe^{+++}$ ions as much as possible, it is also desirable for the complexing agent to have an inherent reducing power suitable for the reduction of $Fe^{+++}$ ion to $Fe^{++}$ ions. Examples of useful complexing agents are gallic acid, pyrogallol, tannic acid, glutamic acid and mannitol. As illustrated in Example 9, complexing agents that give an iron complex that are insoluble in an alkaline medium, e.g. oxine (hydroxy8-quinoline), are not suitable for practising the invention.

The particles obtained by the process of the invention have a small diameter, i.e. an average diameter up to 0.05 micrometer, typically from 0.02 micrometer to 0.05 micrometer, although particles having a still smaller diameter can be obtained.

Ferrous salts that are conventionally used in processes of the type described herein normally contain ferric ion contaminants. In practising the invention, reducing conditions are employed that are sufficient to achieve reduction of ferric ion contaminants in the ferrous salt prior to and/or during addition of the aqueous ferrous salt solution to the aqueous alkaline hydroxide solution. Such reducing conditions can be provided in many ways, as described in Pinguad U.S. Pat. No. 4,376,714, issued Mar. 15, 1983. For example, the aqueous ferrous salt solution can be added to the aqueous alkaline hydroxide solution in the presence of a sufficient concentration of reducing agent to reduce ferric ion contaminants to ferrous ions. Such ferric ions can be reduced to ferrous ions by other means such as subjecting the ferrous salt solution to electrolytic reduction. However, a reducing agent typically used in the ferrous salt solution and/or in the alkaline hydroxide solution to provide the necessary reducing solutions. Reducing agents suitable for this purpose include ferric ion reductants that generally are soluble in the reaction medium, active under the conditions of the process, e.g. the pH, and do not deleteriously affect the particle shape or the crystalline structure of the ferrous hydroxide and delta ferric oxide hydrate particles formed during the process. In general, such reducing agents possess a reduction potential that is more negative than $+1$ volt determined on a suitable electrode, e.g. a carbon paste electrode, with respect to a normal hydrogen electrode. Typical reducing agents are organic or inorganic reducing agents, including sulfites such as sodium sulfite and potassium sulfite, hydrosulfites such as sodium hydrosulfite, potassium hydrosulfite, calcium hydrosulfite, dihydrobenzenes such as hydroquinone, hydroxylamines such as hydroxylamine hydrochloride, phosphites such as sodium phosphite, hypophosphites such as sodium hypophosphite, manganous hypophosphite, potassium hypophosphite, water-soluble hydrazine derivatives, as well as reducing gases such as hydrogen. Sulfites such as sodium sulfite or hydrosulfites such as sodium hydrosulfite ($Na_2S_2O_4.2H_2O$) are preferred because upon oxidation they form sulfates which are normally present in the precipitation medium in large amounts.

The reducing agent can be added to the reaction medium in any convenient manner and is generally present, at least in part, when the ferrous salt solution is added to the alkaline hydroxide solution. For example, a suitable reducing agent can be introduced into the reaction medium while the aqueous solution of ferrous salt is added to the aqueous solution of alkaline hydroxide. However, it is usually most convenient to incorporate the reducing agent or a mixture of reducing agents into either or both of the ferrous salt solution and the alkaline hydroxide solution. The same or different reducing agent can be used in each of these solutions, but generally the same reducing agent is used in each of these solutions. Where the reducing agent is incorporated into the alkaline hydroxide solution, it is often desirable to employ a reducing agent that is capable of reducing oxygen that may be dissolved in such solution and is also capable of preventing the oxidation of ferrous ions to ferric ions in the alkaline environment of the process. Illustrative reducing agents of this type include sodium hydrosulfite, hydroquinone and hydroxylamine hydrochloride. Typical techniques include the use of sodium hydrosulfite in both the ferrous salt solution and the alkaline hydroxide solution or sodium sulfite or sodium hydrosulfite in the ferrous salt solution and hydroquinone in the alkaline hydroxide solution.

The concentration of reducing agent employed in the practice of this invention is subject to wide variation and depends upon several factors, including its activity and the concentration of ferric ion contaminant present in the ferrous salt. It is possible for one skilled in the art to readily determine the optimum concentration of reducing agent. When the reducing agent is introduced into the ferrous salt solution, a concentration in the range of about 10 to 100 milliequivalents, often about 10 to 20 meq. per mole of ferrous salt in the solution, usually gives acceptable results. Typical concentrations when reducing agents are used in alkaline hydroxide solutions are about 2 to 12 meq., often about 4 to 8 meq. per liter of such solution.

As previously stated, the concentration of ferric ion contaminants in the ferrous salts employed in the practice of the invention are very low. They generally do not exceed about 2 percent, by weight, and are typically in the range of about 0.2 to 0.5 percent, by weight, based on ferrous salt. Such salts are available commercially in both Commercial Grade and Chemically Pure Grade from several manufacturers including USINOR, 60160 Montataire, France; G.T.Baker Chemical Co., Phillipsburg, N.J.; Merck and Co., Rahway, N.J.; Mallinckrodt Chemical Works, St. Louis, Mo.; S. B. Penick Unit of CPC International, New York, N.Y., and United Mineral and Chemical Corp., New York, N.Y.

In practicing this invention, the particles of ferric oxide hydrate are prepared by first adding an aqueous solution of a ferrous salt to an aqueous solution of an alkaline hydroxide, generally under non-oxidizing conditions. An aqueous alkaline hydroxide solutions is a solution of a compound which will react with the ferrous salt to precipitate ferrous hydroxide, for example, an alkaline hydroxide of one of the alkali metals such as sodium or potassium. The non-oxidizing conditions generally employed are such that essentially no ferric hydroxide contaminant is introduced into the precipitated ferrous hydroxide and subsequent oxidation of ferrous ions to ferric ions does not begin until desired. Oxygen should be excluded from contact with the reacting solution to such an extent that at the end of the precipitation of the ferrous hydroxide, the ferric ion content in the dispersion is less than 1%, by weight, of the ferrous ion content, and preferably substantially zero, as ascertained by potentiometric measurement and analysis.

It is important to add the aqueous ferrous salt solution to the alkaline hydroxide solution, rather than to add these solutions in the reverse order. When the aqueous alkaline hydroxide solution is added to the aqueous ferrous salt solution, the precipitation of the ferrous hydroxide particles begins under acid conditions and is completed in a basic medium. Such process requires that subsequent oxidation of the particles be spread over a long period, e.g. 100 hours or more, in order that unwanted complexes that are formed can be oxidized to particles of delta-ferric oxide hydrate. Such long oxidation periods are very detrimental to the chemical and electrical properties of magnetic iron oxide particles or magnetic metallic particles formed from such particles.

The iron selective complexing agent employed in practicing this invention can be introduced into the reaction medium prior to precipitation of ferrous hydroxide. The complexing agent can also be introduced into the reaction medium after precipitation of ferrous hydroxide and prior to the oxidation step in which the hydroxide is converted into delta ferric oxide hydrate. Typically, the amount of complexing agent is in the range of from 10 meq. to 100 meq., often from 20 to 80 meq., per mole of ferrous compound in the reaction medium. The amount of complexing agent used in a specific situation depends upon the operating conditions such as the temperature and the concentration of the ferrous salt as well as upon the purity of the raw materials employed.

As previously indicated herein, useful complexing agents, include gallic acid, pyrogallol, tannic acid, glutamic acid, and mannitol. The complexing agent can be added to the reaction medium in any suitable manner.

Typically, when the complexing agent is introduced into the reaction medium prior to the precipitation of ferrous hydroxide, it is incorporated both into the alkaline hydroxide solution and the ferrous salt solution. The total amount of complexing agent employed is, as previously stated, typically in the range of from 10 meq. to 100 meq. per mole of ferrous compound. If desired, the complexing agent can be incorporated only in the ferrous salt solution.

Introduction of the ferrous salt solution into the reaction medium can conveniently be accomplished by using a device which makes it possible to violently disperse and intermix the ferrous salt rapidly while the liquid-air interface is maintained sufficiently calm such that an undesirable amount of air is not introduced into the solution. Such a device avoids any localized imbalance of reagent concentrations and can also be used for the subsequent introduction of oxygen, for example, as oxygen gas or as air into the dispersion. Advantageously a device such as that described in U.S. Pat. No. 2,996,287, issued Aug. 15, 1961 is used. This device, which can be called a "rotary saucer" comprises two coaxial cones, opposed at their bases and very close to each other, carried on a hollow shaft, with openings which enable communication between the interior of the shaft and the open area on the periphery located between the two cones. The shaft is connected to a motor device which imparts to the shafts and to the cone a rotary movement (about 2800 rpm for cones of about 20 cm diameter) and assures a centrifugal effect on the fluids that are in contact with the walls of the cone. Suitable valves permit adding liquids or introducing air or another gas through the hollow shaft. First the solution of ferrous salt is admitted to the hollow shaft, and thereupon the liquid particles escaping from this shaft and from between the cones in this area can be rapidly dispersed in the liquid mass wherein the cones turn.

After rapid dispersion of the solution of ferrous salt into the alkaline solution, the precipitated ferrous hydroxide is oxidized so that uniform crystals are formed. In order to assure a constant speed to this reaction, the oxidizing agent, usually air, is sucked into and dispersed in the suspension by means of the hollow shaft and the saucer. The air must be admitted in progressively increasing volumes because the thickening of the suspension makes the solid-gas exchange and the diffusion of the oxygen progressively less efficient. When oxidation is completed, the dispersion is advantageously brought to boiling and boiled for a short time, such as one hour or one half hour, to perfect the crystallization of the delta ferric oxide hydrate particles. Then the dispersion is filtered and the delta ferric oxide hydrate particles are washed and dried. If other techniques for achieving intermixing are employed, a blanket of nitrogen or argon can be maintained over the surface of the reactants so that premature oxidation does not occur.

When the complexing agent is introduced into the reaction medium after precipitation of the ferrous hydroxide it is added to the reaction medium with stirring, just prior to the oxidation step. The oxidation step of the ferrous hydroxide into delta ferric oxide hydrate is then carried out as previously described.

The conditions for precipitation and oxidation of the ferrous hydroxide depend on various factors such as the concentration of the ferrous salt solution, the excess of the alkaline solution, the duration of the precipitation and of the oxidation and the reaction temperature. The delta ferric oxide hydrate of the final dispersion should not exceed about 60 g per liter. Typically such content is in the range from about 20 g per liter to about 45 g per liter.

The quantity of alkaline hydroxide in the solution is used in the process is subject to wide variation. Typically it is between the stoichiometric quantity required to precipitate all of the ferrous salt as ferrous hydroxide and the quantity corresponding to an excess of 300 percent or more. It is advantageous to use an excess of less than about 100 percent and preferably to use the stoichiometric quantity of alkaline hydroxide needed for the reaction. The use of such quantities of alkaline hydroxide provides economies in operation in comparison to comparable prior art processes that employ larger excesses of alkaline hydroxide and avoids pollution problems with effluents.

The alkaline hydroxide solution employed to precipitate the ferrous salt as ferrous hydroxide can be a hydroxide of any alkali metal from Group IA of the Periodic Table, for example, sodium hydroxide or potassium hydroxide. The ferrous salt used can be any salt or hydrate thereof that is sufficiently soluble to make the starting solution and which will not complex the ferrous hydroxide. Ferrous chloride having 4 molecules of water, or ferrous sulfate having 7 molecules of water are common examples of such salts.

The precipitation of ferrous hydroxide is generally accomplished quite rapidly, advantageously in less than about 10 minutes. Generally the dispersion of ferrous hydroxide is stirred for a period of time, e.g. about 30 minutes, before oxidation begins to insure that all of the ferrous salt is precipitated as a homogeneous ferrous hydroxide.

The time required to complete the oxidation of ferrous hydroxide is dependent on several factors, including the rate at which oxygen, generally as air, is introduced into the dispersion, the temperature, the alkaline hydroxide excess and the concentration of the ferrous hydroxide in the dispersion. Oxidation can generally be started about 30 minutes after terminating the inflow of the ferrous salt solution so that all of the ferrous hydroxide is precipitated and comes to equilibrium in the suspension. The duration of the oxidation is subject to variation; it is usually completed in 3 hours, but longer periods can be used. However, it is generally unnecessary to use oxidation periods in excess of 6 hours. When oxidation is complete, the dispersion is brought to boiling for a short time, e.g. 30 minutes to one hour, in order to complete and perfect the crystallization of the delta ferric oxide hydrate particles. Then the dispersion is cooled, filtered and the crystals obtained are washed with water and dried. The temperature during precipitation and oxidation is generally kept lower than 60° C., e.g. 25° C.

Figure 3:
FIG. 3 is an electron micrograph (magnification 450,000 X) of a sample of delta ferric oxide hydrate facetted nodular particles of the invention.

The delta ferric oxide hydrate particles obtained by the process of this invention are in the form of facetted nodules whose diameter typically varies from 0.02 micrometer to 0.05 micrometer. FIG. 3 shows an electron micrograph (magnification 450,000X) of delta ferric oxide hydrate particles obtained by the process of the invention, whose average diameter is about 0.03 micrometer (largest dimension).

As is obvious to those in the art, ions of doping metals can be introduced into the delta ferric oxide hydrate particles. For example, ions of alkaline earth metals can be introduced during the washing step of the particles by using water containing such ions, e.g. water containing calcium chloride or calcium bicarbonate. Ions of polyvalent doping metals can also be introduced into the delta ferric oxide hydrate particles by dissolving suitable water-soluble compounds (e.g. sulfates or nitrates) in the initial solution of ferrous salt. Examples of such doping metals include cobalt, nickel, chromium, zinc, cadmium, manganese, tin, samarium neodynium and europium. As is well known, magnetic iron oxides can be doped after formation of the particles. Of course, magnetic iron oxides can be doped by mixtures of doping metal ions including the above mentioned doping ions. The concentration of doping metal ions employed may vary in a wide range. However, dopant levels in the range of about 1 to about 7 atomic percent, often about 1 to about 4 atomic percent, are typical.

The nodular delta ferric oxide hydrate particles initially obtained in the process of the invention are converted to nodular magnetic iron oxide particles such as magnetite ($Fe_3O_4$) particles by dehydration and reduction or to nodular gamma ferric oxide (gamma $Fe_2O_3$) particles by dehydration, reduction and oxidation without changing the shape of the facetted nodular precursor particles. The delta ferric oxide hydrate particles can also be converted to facetted nodular magnetic iron oxide particles such as solid solutions having an intermediate composition between magnetite ($Fe_3O_4$) and gamma $Fe_2O_3$ either by dehydration and reduction to $Fe_3O_4$, oxidation to gamma $Fe_2O_3$ and again partial reduction or by dehydration and reduction to $Fe_3O_4$ and partial oxidation. These particles of solid solutions may contain in their lattice up to 30 atomic percent, often from 12 to 20 atomic percent of ferrous salt. The delta ferric oxide hydrate particles can be converted to facetted nodular metallic particles (iron powder) by dehydration and total reduction. To obtain particles of magnetic $Fe_3O_4$, the delta ferric oxide hydrate particles are dehydrated at a temperature of from about 100° C. to 350° C., e.g. at about 270° C., then are reduced with hydrogen at a temperature of about 300° C. to 400° C., e.g. about 350° C. If it is desired to obtain gamma ferric oxide particles, the oxidation phase required is generally accomplished with air at a temperature in the range of from 300° C. to 400° C., typically at about 350° C.

If it is desired to obtain facetted nodular particles of solid solutions by partial reduction of gamma $Fe_2O_3$ oxide, the necessary reduction phase is generally accomplished at a temperature of about 325° C. to 450° C. If the particles of solid solutions are prepared by partial oxidation of $Fe_3O_4$, the necessary oxidation phase is generally accomplished at a temperature of about 325° C. to 425° C.

When it is desired to obtain metallic facetted nodular particles, the delta ferric oxide hydrate particles are dehydrated, reduced to $Fe_3O_4$ at the conditions previously indicated and the $Fe_3O_4$ oxide is reduced to the matallic state of iron with hydrogen at a temperature of about 300° C. to 450° C.

The facetted nodular particles prepared as described herein have a narrow size distribution and can be employed in magnetic recording layers on a wide variety of non-magnetizable supports, including paper, film and similar supports. Such particles can be used in audio, video and instrumentation recording tapes and in magnetic disks. Suitable supports can be subbed by known methods, are generally flexible and include such materials as cellulose acetate film, polyvinyl acetal film, polystyrene film, polyesters such as poly(ethylene terephthalate) film which can be biaxially or asymmetrically stretched, polycarbonate film, paper and metal, such as aluminum or brass. The thickness of the support is subject to variation but such supports generally have a thickness in the range of about 4 micrometers to about 300 micrometers, often in the range of about 6 micrometers to about 30 micrometers, and most often in the range of about 12 micrometers to about 25 micrometers. The support surface coated with the magnetic composition should be as smooth as possible.

Binders that can be used to disperse the nodular magnetic iron oxide particles include any of the binders well known for the manufacture of magnetic recording layers. Typical binders are polymeric binding agents such as copolymers of vinyl acetate with vinyl chloride copolymers of vinylidene chloride with acrylonitrile, copolymers of acrylic and/or methacrylic esters, polyvinylbutyral, copolymers of butadiene with styrene, terpolymers of acrylonitrile, vinylidene chloride and maleic anhydride, crosslinked or noncrosslinked, homopolymers or copolymers such as polyamides, polyurethanes, polyesters and the like as well as mixtures of these binders. Very good results can be obtained with a copolymer of vinyl acetate with vinyl chloride, partially hydrolyzed, and possibly cross-linked with an isocyanate or any of the many similar reactive constituents, or by using polyurethanes or polyesters or a mixture of these binders. The amount of the binder employed with respect to the amount of nodular magnetic iron oxide particles is generally in the range of about 10 percent to about 40 percent, by weight, and preferably from about 15 percent to about 25 percent, by weight. When metallic particles are dispersed, the use of chlorinated binders is not recommended but any of the other above mentioned binders can be used. The amount of the binder employed with respect to the amount of such particles is generally in the range from about 10 percent to about 35 percent by weight, advantageously from about 15 percent to about 20 percent by weight.

Suitable solvents that can be employed in the preparation of the magnetic dispersions include organic materials such as butyl acetate, cyclohexanone, butyl alcohol, methylene chloride and mixtures thereof. The magnetic recording layers can contain other additives such as lubricants, as will be obvious to those skilled in the art.

The magnetic layers obtained with the facetted nodular magnetic particles of the invention are characterized by a high packing factor. The term "packing factor" is the volume of magnetic material per volume unit of the magnetic layer. This high packing factor is the result of the facetted nodular shape of the particles which provides a low intergranular porosity and an absence of substantial intragranular porosity.

It is known that the total porosity of a distribution of magnetic particles includes both intergranular porosity and intragranular porosity. The intergranular porosity corresponds to the spaces or pores between the particles or agglomerates of particles and depends on their shape and on their size. The intragranular porosity is related to the pits or pores inside the individual particles that are generated by the removal of ions during the dehydration and reduction reactions.

The intergranular and intragranular porosities of distributions of samples of particles of this invention can be determined using any suitable means. For example, such porosities have been determined by means of a Coultronics mercury intrusion porosimeter, Model 9200. The operation of this porosimeter is based upon the principle that mercury will not penetrate very fine pores until sufficient pressure is applied to force its entry. The relatioship between the applied pressure and the pore diameter into which mercury will intrude is given by the Washburn equation:

$$r = \frac{-2\gamma\cos\theta}{P}$$

wherein r is the pore radius, P is the applied pressure, $\gamma$ is the surface tension of mercury and $\theta$ is the contact angle between mercury and the pore wall, usually near 130°. The size of the intruded pore is in inverse order of the applied pressure.

Figure 4:
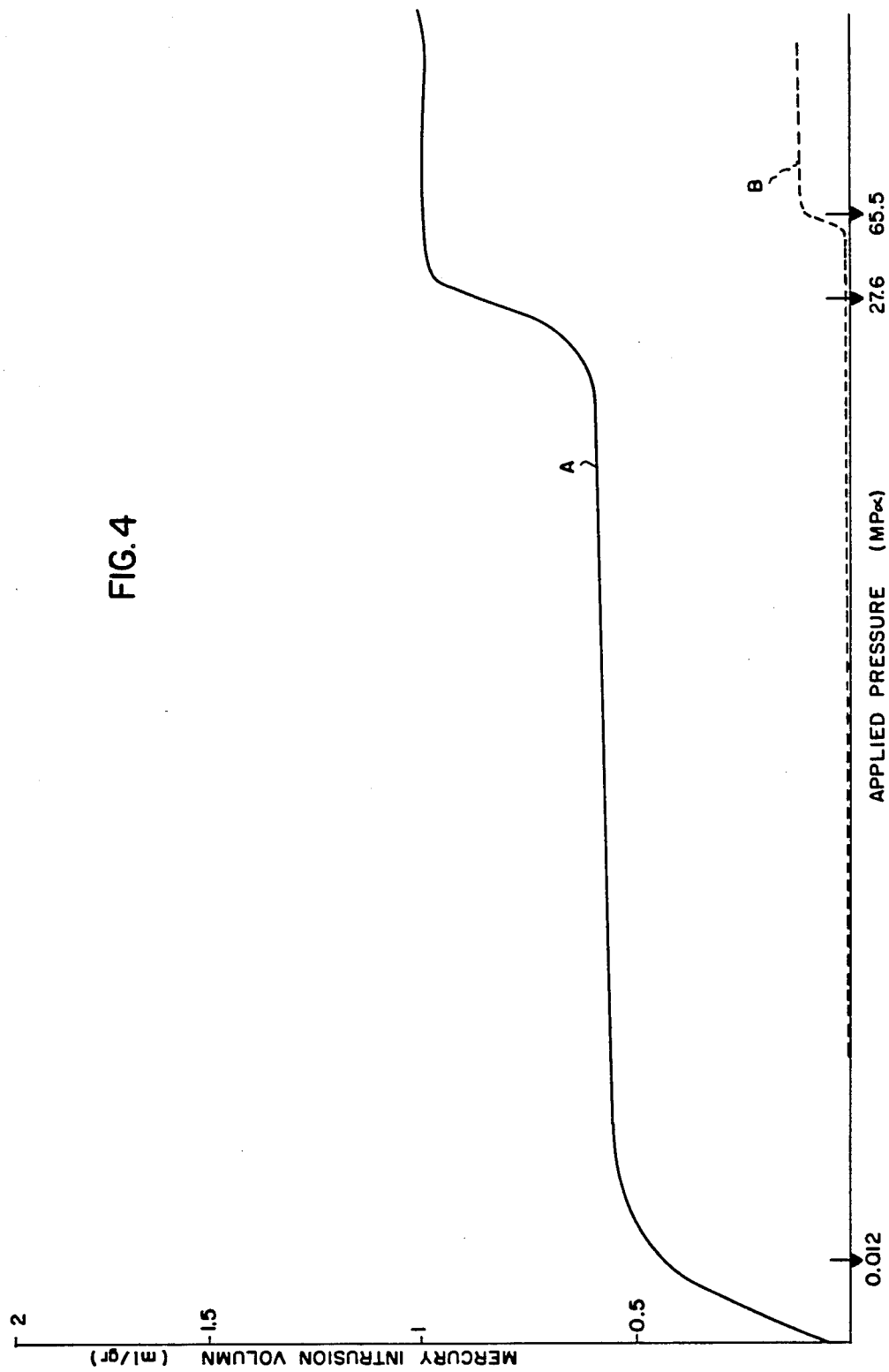
FIG. 4 relates to porosity measurements made with a conventional mercury porosimeter and depicts the mercury intruded volume as a function of the applied pressure for (A) a sample of acicular magnetic matallic particles obtained according to the prior art, i.e. in the absence of complexing agent and (B) a sample of facetted nodular magnetic metallic particles prepared according to the invention.

Comparative measurements were made on a sample of acicular metallic particles having a length of 0.4 micrometer and on a sample of metallic particles of 0.03 micrometer of this invention. The two curves in FIG. 4 depict a program showing the mercury intrusion volume as a function of the applied pressure for the two samples.

Curve A corresponds to a sample of acicular metallic magnetic particles having a length of 0.4 micrometer. This curve shows that as the mercury pressure is increased there are two distinct intrusions of mercury into the sample that correspond to the initial penetration of the intergranular pores and the subsequent penetration of the intragranular pores with a total volume of intruded mercury of 1.05 ml/g for a mercury pressure of 27.6 MPa.

Curve B corresponds to the sample of facetted nodular metallic magnetic particles of this invention having an average diameter of 0.03 micrometer. This curve shows one slight but distinct intrusion of mercury that corresponds to the filling of the intragranular pores for a mercury pressure of 65.5 MPa.

Figure 5:
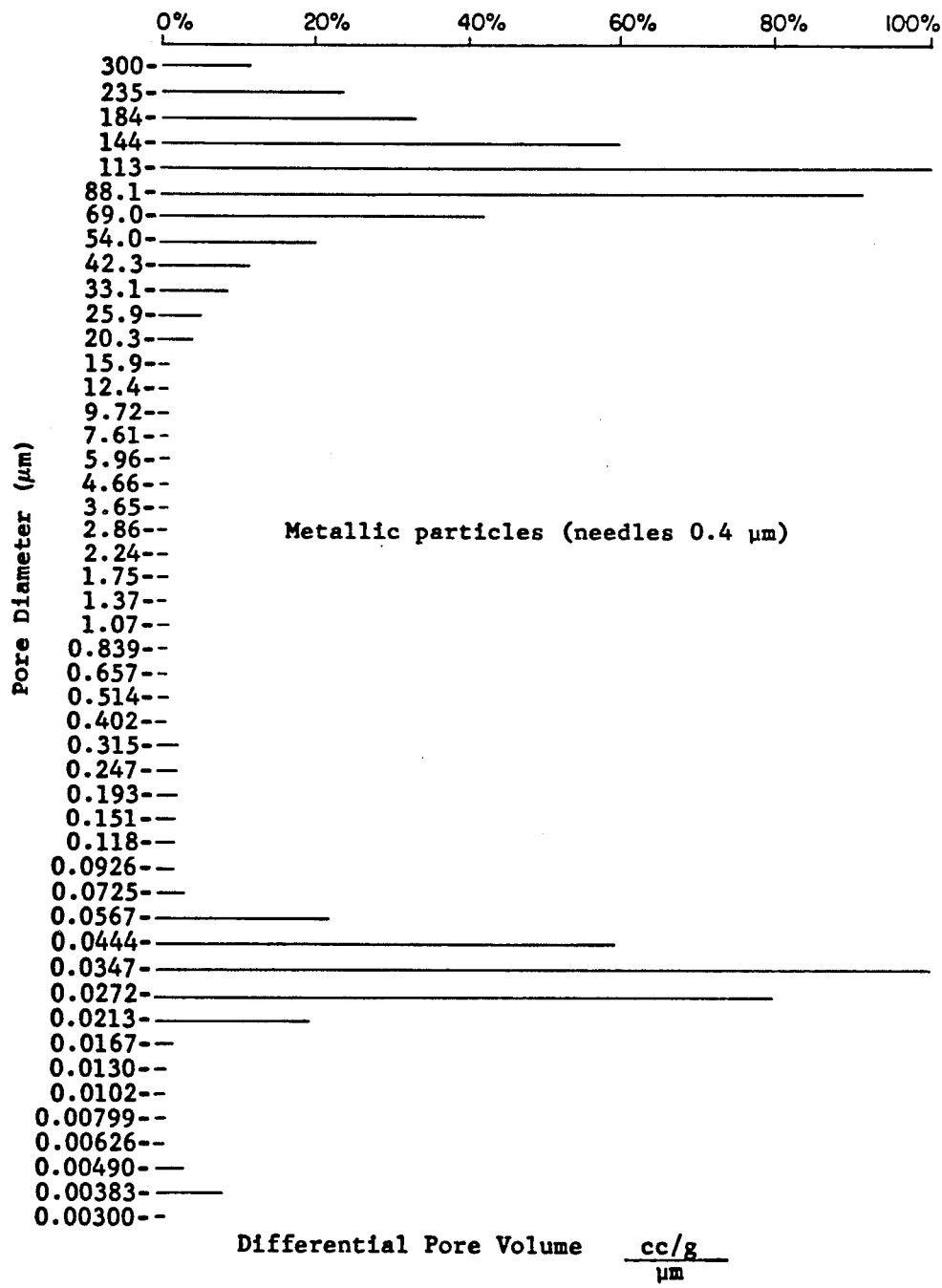
FIGS. 5 and 6 also relate to porosity measurements and depict the differential volume of the pores as a function of their radius for acicular magnetic metallic particles and for facetted nodular metallic particles of this invention, respectively.
Figure 6:
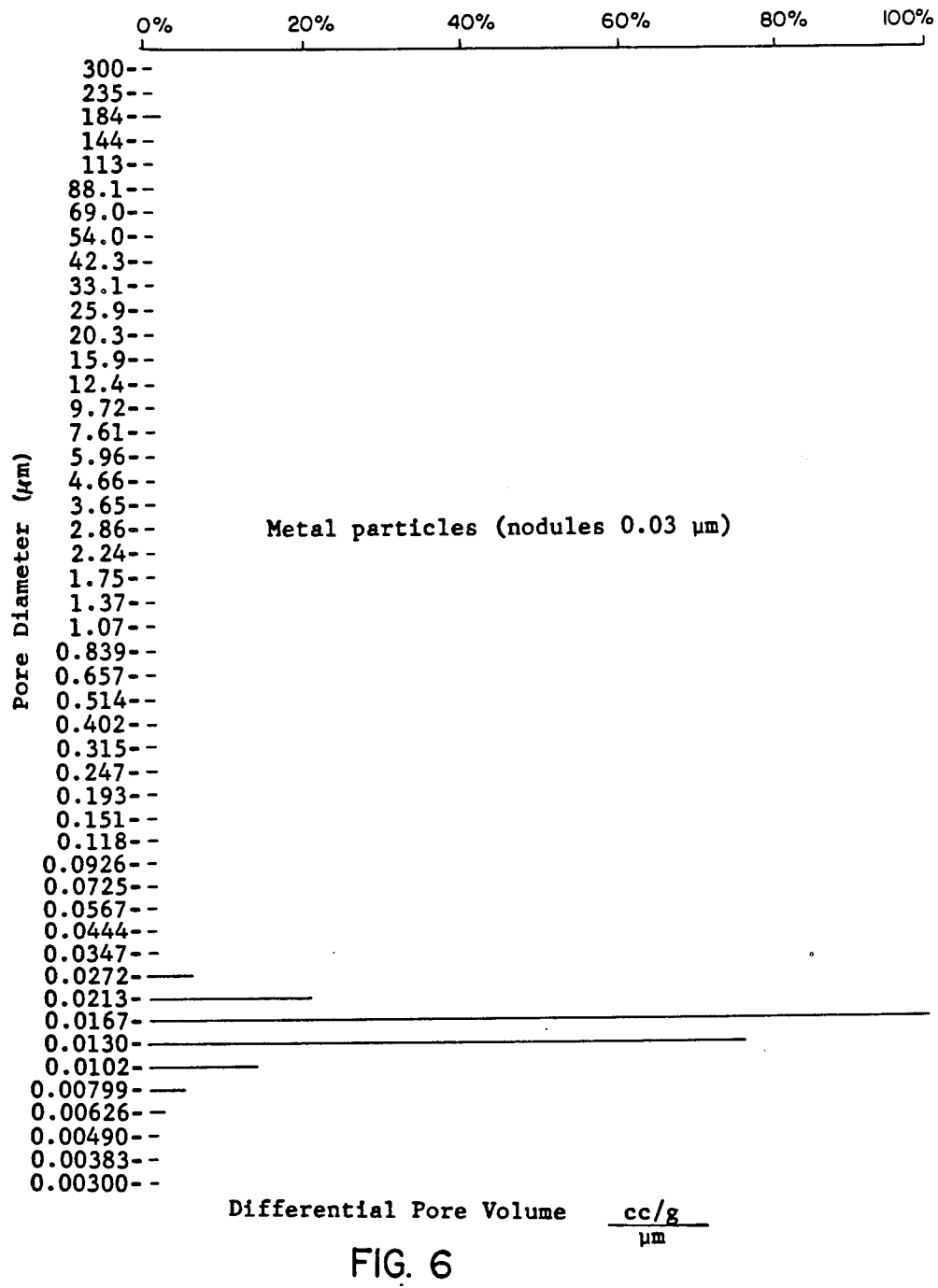

FIGS. 5 and 6 depict the differential volume of the pores as a function of their diameter.

As shown in FIG. 5, the prior art acicular particles have two distinct pore families. One family has pore diameters over the range of about 20.3 to 300 micrometers (large intergranular pores) and the other over a range of about 0.00383 to 0.315 micrometers (small intragranular pores).

FIG. 6 shows only one pore family for the facetted nodular magnetic metallic particles of the invention at a pore diameter of 0.00626 to 0.0272 micrometer (intergranular pores).

The measurements shown in FIGS. 4–6 clearly illustrate that the metallic magnetic facetted nodular particles of this invention have no substantial intragranular porosity and only a small intergranular porosity whereas the acicular metallic magnetic particles of the prior art have both intergranular porosity and intragranular porosity.

The absence of substantial intragranular porosity in the facetted nodular magnetic particles of this invention can also be confirmed by calculation. Thus, a porosity factor of 43 percent is calculated for the metallic particles of FIGS. 5 and 6 using the formula:

$$p = \frac{Vp}{Vp + \frac{1}{\rho}} \times 100$$

where Vp is the total volume of the pores and $\rho$ is the density. This value of 43 percent is very close to 40 percent which is the theoretical value corresponding to monodimensional spherical elements. Accordingly, this calculation confirms the absence of substantial intragranular porosity in the facetted nodular magnetic metallic particles. Moreover, as shown in FIG. 6, the majority of the pores in the metallic particles have a diameter of the order of 0.14 micrometer. Obviously, pores having such large diameters cannot be present as intragranular pores in metallic particles having only an average diameter of about 0.03 micrometers. Also, high resolution electron micrographs such as the one shown in FIG. 3 further confirm the absence of any substantial intragranular porosity in the particles of this invention. The absence of significant intragranular porosity in the facetted modular magnetic particles of this invention permits magnetic layers that are more compact than can be obtained with the more porous acicular particles of the prior art. Such compact layers provide higher remanent magnetization and increased output signal level.

It is known that the smoothness of the surface of a magnetic recording element is very important in obtaining good signal reproduction, particularly at short wavelengths, because the magnetic flux decreases greatly as the distance separating the recording head and the magnetic layer increases. Furthermore, variations in coupling between the recording or reproducing head and the magnetic recording layer increases the noise level and also the abrasion of the recording head. Accordingly, it is preferred that the magnetic recording layers be as smooth as possible. Such smoothness can be obtained e.g. by calendering, according to the teachings of the Legras et al U.S. Pat. No. 4,163,823, issued Aug. 7, 1979. This smoothness can be expressed in terms of "percent contact area" which is determined with relation to a reference surface consisting of the hypotenuse surface of a transparent optical prism. The value of an incident luminous flux directed for total reflection from the hypotenuse surface is equal to $\phi$. The flux reflected by the hypotenuse surface is, therefore, equal to $\phi$ but is reduced and becomes $\phi'$ when a light absorber is placed in optical contact with the hypotenuse surface. A sample of the magnetic element being measured, when contacted under controlled pressure against the hypotenuse surface of the prism (with the outermost magnetic recording layer of the element in contact with the surface) produces light absorption that increases as the smoothness increases. The "percent contact area" is equal to $[(\Phi-\Phi')/\Phi]\times 100$. The value of this "percent contact area" increases with the flatness of the surface of the recording magnetic layer, i.e. with the surface smoothness of the layer. A magnetic recording element of this invention, when subjected to calendering, exhibits a surface smoothness, determined as "percent contact area" of at least about 86 percent and often up to 90 percent or more.

Magnetic recording elements comprising dispersions of facetted nodular magnetic iron oxide particles or facetted nodular metallic particles of the invention in a suitable binder exhibit excellent recording and reproducting characteristics. These magnetic recording elements are capable of exhibiting very good magnetic isotropy. Such magnetic isotropy is particularly useful in magnetic disks. In an isotropic layer, the coercivity and remanent magnetization values measured in three orthogonal directions, e.g. the X, Y and Z directions, are substantially equal regardless of the value of the coercivity. Typically, when coercivity and remanent magnetization values are measured along X, Y and Z axes, they do not differ from one another by more than 5 percent, often they do not differ from one another by more than 2 percent.

A method for making coercivity and intensity of remanent magnetization measurements that demonstrate the magnetic isotropy of a magnetic recording element is as follows:

METHOD FOR MEASURING MAGNETIC ISOTROPY

A sample of magnetic tape having the coating longitudinal direction (X) identified, is cut in the shape of a disk having a diameter of 6 mm.

The magnetic properties of this sample are measured by means of a vibrating sample magnetometer supplying a maximum magnetizing field of 795.8 kA/m (10,000 Oe).

Magnetizing fields are applied along the directions X, Y and Z (Z perpendicular to the plane XY, X perpendicular to Y) to provide a hysteresis loop on which the various parameters are measured; coercivity ($H_c$) in kiloamperes per meter (kA/M) and intensity of remanent magnetization (Ir) in milliteslas (mT).

For measurements in the Z direction, a demagnetization factor N=0.975 is used. This factor takes into account the fact that the Z direction dimension in each layer is very small in comparison to the X and Y direction dimensions. The magnetic properties measured are those that are a function of the magnetic field applied to the sample according to the relation:

Magnetic field of the sample = External magnetizing field - N x saturation magnetization A method of calculating the demagnetization factor (N) is given in "Magnetostatic Principles in Ferromagnetism", Interscience Publishers, Inc., New York, 1962, at pages 187-192.

Magnetic recording elements obtained using dispersions of the facetted nodular magnetic particles prepared according to the invention have a very low background or zero signal noise. This can be demonstrated by preparing an isotropic magnetic tape having a layer containing nodular particles of the invention and comparing the properties of this tape with those of an isotropic magnetic tape containing acicular particles of magnetic iron oxide as described in Pinguad U.S. Pat. No. 4,376,714, issued Mar. 15, 1983. When measurements are made on these two tapes using conventional equipment; the tape prepared with the particles of magnetic iron oxide obtained according to the process of the invention exhibits an improvement in signal to noise ratio of at least 2 dB in comparison to the control tape. This improvement results essentially from the lower background noise.

The output level or signal of magnetic recording elements obtained using dispersions of nodular particles prepared according to the following examples was measured using conventional procedures and the following specific test conditions:

Measurement Procedure

1. Measurement Conditions

| | |
|---|---|
| Tape recorder | Honeywell 7600 |
| Linear speed of the tape | cm/s 19.05 (7.5 in/s) |
| Recording gap | $\mu$m 0.3 |
| Playback gap | $\mu$m 0.3 |
| Track width | mm 0.25 (0.0010 in) |

2. Output Level

The bias current is increased while monitoring the output at 300 kHz until the maximum output is observed. Then the bias current is further increased until the output at 300 kHz is reduced to 2 dB below the maximum signal level.

The recording current at the operating bias current is increased until the output of a 30 kHz sine wave recording contains 1% of the third harmonic component (90 kHz).

The output levels are expressed in dB with respect to 1 mV at the terminals of the playback head.

3. Noise

The demagnetized tape is read through a filter centered at the frequency of interest and having a bandwidth equal to 3 kHz. The noise is expressed is dB with respect to 1 mV at the terminals of the head.

This invention is further illustrated by the following examples of its practice. In each of these examples, the ferrous salt employed was Commercial Grade and contained the normally occurring ferric ion contaminants. No specific treatment was used to add or remove ferric ions. Such ferrous salts contained up to about 0.5 percent, by weight, of ferric ions, based on the weight of the salt. The Commercial Grade ferrous sulfate used in the examples was obtained from Usinor, 60160 Montataire, France, under the designation Sulfate Ferreux Neige, Norme NFU43010.

For convenience, cobalt ions were used as dopant ions in the following examples. It is obvious to those skilled in the art that other dopant ions of the type disclosed herein, could be employed in the usual manner.

The facetted nodular particles of this invention that were prepared according to the following examples show no substantial porosity, as determined by the mercury intrusion method described previously herein.

The alpha and delta crystalline forms of the ferric oxide hydrates prepared in the following examples are confirmed by the x-ray powder diffraction technique described previously herein.

EXAMPLE 1

(A) 10 liters of demineralized water, 432 g (91 percent excess) of sodium hydroxide, 5 g of pyrogallol complexing agent and 6 g of sodium hydrosulfite ($NaS_2O_4.2H_2O$) reducing agent were placed in a 20 liter vessel. After complete dissolution of the components in the solution, the temperature was lowered and stabilized at 25° C. Using the dispersing and stirring device of U.S. Pat. No. 2,996,287, issued Aug. 15, 1961 (corresponding French Pat. No. 1,157,156) and described hereinbefore, a solution containing 2 liters of demineralized water, 750 g of ferrous sulfate ($FeSO_4.7H_2O$), 34 g of cobaltous sulfate ($CoSO_4.7H_2O$), 5g of pyrogallol and 5 g of sodium hydrosulfite ($Na_2S_2O_4$) was flowed into the sodium hydroxide solution in 5 minutes. The solution in the reaction vessel was maintained at 25° C. throughout the reaction.

30 minutes after the end of the precipitation air was blown progressively into the suspension of ferrous hydroxide maintained at 25° C., at a flow rate of 30 liters/hour using the aforementioned dispersing device.

After 3 hours of oxidation, the temperature was raised to the boiling point of the dispersion for 30 minutes. The dispersion contained about 20 g/liter of cobalt doped delta ferric oxide hydrate. The dispersion was filtered, washed with demineralized water, and the cobalt doped delta ferric oxide hydrate particles were dried. The resulting delta ferric oxide hydrate particles were facetted nodules and had an average diameter in the range of from 0.025 micrometer to 0.04 micrometer.

FIG. 1 shows electron micrographs (magnification 100,000 X) obtained after precipitation of the ferrous hydroxide and after oxidation times of 30 minutes, 1 hour and 2 hours, respectively. These micrographs clearly show the direct conversion of ferrous hydroxide to delta ferric oxide hydrate without any change in the shape or size of the particles.

(B) for comparative purposes, the previously described procedure in A was repeated but without adding pyrogallol to the alkaline hydroxide solution and to the ferrous salt solution. In this case, at the end of the oxidation, acicular alpha ferric oxide hydrate particles were obtained having an average length of 0.3 micron and an average acicularity of 10.

Figure 2:
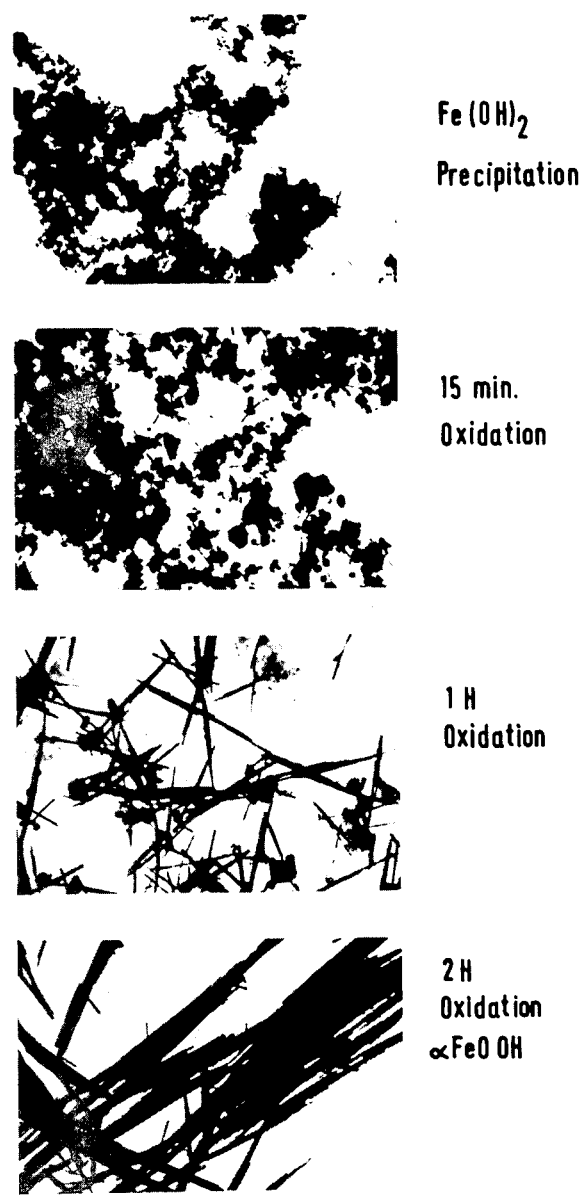
FIG. 2 is a series of electron micrographs (magnification 100,000 X) depicting the formation of acicular alpha ferric oxide hydrate particles obtained according to the prior art, i.e. in the absence of complexing agents.

FIG. 2 shows electron micrographs (magnification 100,000 X) obtained as above. After precipitation of the ferrous hydroxide and after oxidation times of 15 minutes, 1 hour and 2 hours, respectively. These micrographs show the presence of ferrous hydroxide particles at precipitation and the appearance of acicular particles of alpha ferric oxide hydrate that grow with the oxidation time while the ferrous hydroxide particles disappear.

EXAMPLE 2

The procedure of Example 1A was repeated using the same quantities of reactants except that the cobaltous sulfate was omitted from the solution containing ferrous sulfate. As in Example 1A, facetted nodular particles of delta ferric oxide hydrate having an average diameter in the range of from 0.025 to 0.04 micrometer were obtained.

EXAMPLE 3

A 20 liter vessel was used and the procedure of Example 1A was repeated using pyrogallol as the complexing agent, except that the alkaline solution contained 226 g of sodium hydroxide which corresponded to the stoichiometric amount required for the reaction.

As in Example 1A, facetted nodular particles of cobalt doped delta ferric oxide hydrate having an average diameter in the range of from 0.025 micrometer to 0.04 micrometer were obtained.

EXAMPLE 4

The procedure of Example 1 was repeated, but mannitol used in the same amount was substituted for pyrogallol as the complexing agent. A smaller amount of cobalt sulfate was also used in order to obtain a less strongly doped oxide than in Examples 1 and 3.

As in Example 1, a 20 liter vessel was used with the following solutions:
Sodium hydroxide solution

| Demineralized water | 10 l |
| Sodium hydroxide | 666 g |
| (100 percent excess) | |
| Sodium hydrosulfite | 5 g |
| Mannitol | 10 g |

Ferrous salt solution

| Demineralized water | 2 l |

| Ferrous sulfate | 1123 g |
|---|---|
| Cobalt sulfate | 34 g |
| Sodium hydrosulfite | 6 g |
| Mannitol | 10 g |

The precipitation and oxidation temperatures and the precipitation time were the same as in Example 1A, but the oxidation phase of the suspension was 2 hours instead of 3 hours (the air flow rate being the same as in Example 1A). In this example, the final concentration of delta ferric oxide hydrate in the reaction medium was about 30 g/liter.

The dispersion obtained was filtered and the resulting cobalt doped particles of delta ferric oxide hydrate was washed and dried. These facetted nodular particles had an average diameter of from 0.02 micrometer to 0.03 micrometer.

EXAMPLE 5

The procedure of Example 3 was repeated, substituting as in example 4, mannitol for pyrogallol as the complexing agent and using the stoichiometric amount of alkaline hydroxide. Sodium sulfite was substituted in the ferrous salt solution for sodium hydrosulfite.

As in Example 1A, a 20 liter vessel was used with the following hydroxide solutions:

Sodium solution

| Demineralized water | 10 l |
|---|---|
| Sodium hydroxide (stoichiometric amount) | 333 g |
| Sodium hydrosulfite | 5 g |
| Mannitol | 10 g |

Ferrous salt solution

| Demineralized water | 2 l |
|---|---|
| Ferrous sulfate | 1123 g |
| Cobalt sulfate | 34 g |
| Sodium sulfite | 6 g |
| Mannitol | 10 g |

The precipitation and oxidation temperatures as well as the precipitation and oxidation times were the same as in Example 3. The final concentration of delta ferric oxide hydrate in the reaction medium was about 30 g/liter.

Facetted nodular particles were obtained that had an average diameter in the range of from 0.02 micrometer to 0.03 micrometer.

EXAMPLE 6

The procedure of Example 1 was repeated, but gallic acid was substituted for pyrogallol as the complexing agent. A lower amount of cobalt sulfate was used in order to obtain a less strongly doped oxide than in Examples 1A and 3.

Sodium hydroxide solution

| Demineralized water | 10 l |
|---|---|
| Sodium hydroxide (50 percent excess) | 647 g |
| Sodium hydrosulfite | 10 g |
| Gallic acid | 8 g |

Ferrous salt solution

| Demineralized water | 2 l |
|---|---|
| Ferrous sulfate | 1500 g |
| Cobalt sulfate | 34 g |
| Sodium hydrosulfite | 10 g |
| Gallic acid | 8 g |

The precipitation and oxidation temperatures and times were the same as in Example 1A. In this example the final delta ferric oxide doped hydrate concentration in the reaction medium was 40 g/liter.

After filtration of the resulting dispersion, washing and drying of the particles, delta ferric oxide hydrate particles were obtained. They were facetted nodules and had an average diameter in the range of from 0.025 micrometer to 0.04 micrometer.

EXAMPLE 7

The procedure of Example 1A was repeated, but glutamic acid was substituted for pyrogallol as the complexing agent. The reducing agent used was hydroquinone in the alkaline hydroxide solution and sodium sulfite in the ferrous salt solution.

As in Example 1A, a 20 liter vessel was used and the solutions had the following compositions:

Sodium hydroxide solution

| Demineralized water | 10 l |
|---|---|
| Sodium hydroxide (50 percent excess) | 500 g |
| Hydroquinone | 10 g |
| Glutamic acid | 6 g |

Ferrous salt solution

| Demineralized water | 2 l |
|---|---|
| Ferrous sulfate | 1123 g |
| Cobalt sulfate | 34 g |
| Sodium sulfite | 10 g |
| Glutamic acid | 6 g |

The precipitation and oxidation temperatures and times were the same as in Example 1A. The final delta ferric oxide hydrate concentration in the reaction medium was about 30 g/liter.

Facetted nodular particles were obtained that had an average diameter in the range of from 0.025 micrometer to 0.04 micrometer.

EXAMPLE 8

The procedure of Example 1A was repeated except that tannic acid was used as the complexing agent.

The solutions used had the same compositions as in Example 7, except that tannic acid used in the same amount was substituted for glutamic acid.

Facetted nodular particles of delta ferric oxide hydrate were obtained that had an average diameter in the range of from 0.025 micrometer to 0.04 micrometer.

EXAMPLE 9

This is a comparative example.

The procedure of Example 1A was repeated but oxine (hydroxy-8-quinoline) used in the same amount was substituted for pyrogallol as the complexing agent. Contrary to the complexing agents of the previous examples that form soluble complexes with $Fe^{+++}$ ions, the oxine forms insoluble complexes with $Fe^{+++}$ ions.

The precipitation and oxidation temperatures and times were the same as in Example 1A.

The ferric oxide hydrate thus prepared was a heterogeneous mixture including a substantial proportion, for example between 50 percent and 70 percent by weight of acicular particles. This illustrates that complexing agents such as oxine that form insoluble complexes with $Fe^{+++}$ ions are not suitable in this invention.

EXAMPLE 10

In previous examples, the complexing agent was introduced into the reaction medium prior to the precipitation of the ferrous hydroxide. This example and certain later examples show that the complexing agent can be introduced into the reaction medium after the precipitation of the ferrous hydroxide.

10 liters of demineralized water, 485 g (50 percent excess) of sodium hydroxide and 6 g of sodium hydrosulfite ($Na_2S_2O_4.2H_2O$) reducing agent were placed in a 20 liter vessel. After complete dissolution of the components in the solution, the temperature was lowered and stabilized at 25° C. Using the dispersing and stirring device described in the aforementioned U.S. Pat. No. 2,996,287, issued Aug. 15, 1961, a solution containing 2 liters of demineralized water, 1123 g of ferrous sulfate ($FeSO_4.7H_2O$), 34 g of cobaltous sulfate ($CoSO_4.2H_2O$) and 10 g of sodium hydrosulfite ($Na_2S_2O_4$) was flowed into the sodium hydroxide solution in 5 minutes. The dispersion obtained was maintained at 25° C. throughout the reaction.

When the precipitation was over, 12 g of gallic acid complexing agent was introduced into the dispersion.

Thirty minutes after the end of the precipitation, air was blown progressively into the suspension of ferrous hydroxide (maintained at 25° C.,) at a flow rate of 30 liters/hour. The aforementioned dispersing device was used.

After 3 hours of oxidation, the temperature was raised to the boiling point of the dispersion for 30 minutes. The dispersion contained about 30 g/liter of cobalt doped delta ferric oxide hydrate. The dispersion was filtered, washed with demineralized water and the cobalt doped delta ferric oxide hydrate particles were dried. The facetted nodular particles of delta ferric oxide hydrate had an average diameter in the range of from 0.025 micrometer to 0.04 micrometer.

EXAMPLE 11

The procedure of Example 10 was repeated, but the same amount of mannitol was substituted for gallic acid as the complexing agent. As in Example 10, mannitol was introduced into the reaction medium after the precipitation of the ferrous hydroxide.

A 20 liter vessel was used with the following solutions:

Sodium hydroxide solution

| Demineralized water | 10 l |
|---|---|
| Sodium hydroxide (50 percent excess) | 647 g |
| Sodium hydrosulfite | 5 g |

Ferrous Salt solution

| Demineralized water | 2 l |
|---|---|
| Ferrous sulfate | 1500 g |
| Cobalt sulfate | 34 g |

-continued

| Sodium hydrosulfite | 10 g |
|---|---|

The precipitation and oxidation times were the same as in Example 10. The final delta ferric oxide hydrate concentration in the reaction medium was 40 g/liter.

The facetted nodular particles obtained had diameters in the range of from 0.02 micrometer to 0.03 micrometer.

EXAMPLE 12

This example and the following examples describe the preparation of magnetic recording layers containing facetted nodular magnetic particles prepared from the facetted nodular delta ferric oxide hydrate particles of the previous examples.

In this example, delta ferric oxide hydrate particles prepared in Example 1A were used. These particles were converted to cobalt doped particles of gamma $Fe_2O_3$ by the following treatments: dehydration to alpha $Fe_2O_3$ at 270° C., reduction to $Fe_3O_4$ by hydrogen at 325° C. and then oxidation by air at 325° C. The cobalt doped facetted nodular particles of gamma $Fe_2O_3$ thus obtained had an average diameter in the range of from 0.025 micrometer to 0.04 micrometer.

Using these particles, a magnetic dispersion was prepared by mixing the following components in a 1 liter ball mill:

|  | Parts by weight |
|---|---|
| Cobalt doped gamma ferric oxide | 100 |
| Partially hydrolyzed vinyl chloride vinyl acetate copolymer* | 20 |
| Methyl isobutyl ketone | 200 |

*Suitable materials are sold under the trademark VAGH by Union Carbide Corp., and under the trademark Vinnol by Wacker Chemie.

The dispersion obtained was coated on 20 micrometer thick polyester support. The resulting layer was calendared between steel and cotton cylinders, the magnetic layer being against the steel cylinder. The steel cylinder was maintained at a temperature of 85° C. and the force applied between the cylinders was about 80 kg/cm. The final thickness of the resulting magnetic recording layer was about 5 micrometers.

Using the procedures previously described herein, the magnetic and electrical properties and the smoothness of the recording elements were measured.

TABLE I

| Coercivity Hc, kA/m (Oersteds) | X | 64.85 (815) |
|---|---|---|
|  | Y | 64.62 (812) |
|  | Z | 64.06 (805) |
| Remanent Magnetization Intensity, Ir, mT (Gauss) | X | 130 (1300) |
|  | Y | 128 (1280) |
|  | Z | 125 (1250) |
| Smoothness (percentage of contact surface area) |  | 90 |
| Output level w/o bias, 300K (equiv. to 0.63 μm wavelength) dB |  | +9 |
| Zero signal noise dB | 10K | −79 |
|  | 100K | −79 |
|  | 300K | −77 |

EXAMPLE 13

In this example, the facetted nodular delta ferric oxide hydrate particles prepared in Example 1A and the acicular alpha ferric oxide hydrate particles prepared in Example 1B were used. These particles were converted to solid solutions by the following heat treatments:- dehydration to alpha $Fe_2O_3$ at 270° C., reduction to $Fe_3O_4$ at 360° C., reoxidation to gamma $Fe_2O_3$ at 390° C. and again reduction to solid solution at 360° C. The facetted nodular particles of solid solutions obtained had an average diameter in the range of from 0.025 micrometer to 0.035 micrometer. The percent $Fe^{++}$/total Fe in these particles was about 21.

Two magnetic recording elements using these particles and designated A13 and B13 were prepared by the procedure described in Example 12.

Using the procedures previously described herein, the magnetic and electrical properties and the smoothness of the magnetic recording elements (A13 and B13) were measured.

TABLE II

| | | Recording element A13 | Recording element B13 |
|---|---|---|---|
| Coercivity | X | 82.36 (1035) | 81.17 (1020) |
| Hc, kA/m | Y | 81.17 (1020) | 75.60 (950) |
| (Oersteds) | Z | 78.78 (990) | 70.58 (887) |
| Remanent | X | 125 (1250) | 148 (1480) |
| magnetization | Y | 124 (1245) | 143 (1430) |
| intensity, Ir | Z | 123 (1230) | 135.9 (1359) |
| mT (Gauss) | | | |
| Smoothness (percentage of contact surface area) | | 90 | 90 |
| Output level w/o bias 300K (equiv. to 0.63 μm wavelength) dB | | +9 | +10 |
| Zero 10K | | −79 | −77 |
| signal 100K | | −79.5 | −75.5 |
| noise 300K dB | | −77 | −75 |

EXAMPLE 14

In this example, the facetted nodular delta ferric oxide hydrate particles prepared in Example 1A and the acicular alpha ferric oxide hydrate particles prepared in Example 1B were used. These alpha ferric oxide hydrate particles were converted into metallic particles by the following treatments: dehydration to alpha $Fe_2O_3$ at 270° C., reduction to $Fe_3O_4$ at 350° C. and reduction to metallic particles at 350° C.

Two magnetic dispersions were prepared with these particles by mixing the following components in a 1 liter ball mill:

| | Parts by weight |
|---|---|
| Metallic particles | 100 |
| Polyurethane* | 18 |
| Solvent mixture (methyl ethyl ketone/cyclohexanone) | 200 |

*A suitable material is sold under the trademark Estane by Goodrich.

As described in Example 12, the dispersions obtained were coated on a 20 micrometer thick polyester support. After calendering as described in Example 12, magnetic layers having thicknesses of about 7 micrometers were obtained.

Using the procedures previously described herein, the magnetic properties of the magnetic recording elements were determined. The magnetic recording element prepared using the acicular particles was designated A14 and the element prepared using the facetted nodular particles of this invention was designated B14. These elements had the following properties.

TABLE III

| | | Recording element A14 | Recording element B14 |
|---|---|---|---|
| Coercivity | X | 65.57 (824) | 90.32 (1135) |
| Hc, kA/m | Y | 65.65 (825) | 88.73 (1115) |
| (Oersteds) | Z | 64.30 (808) | 77.67 (976) |
| Remanent | X | 281.2 (2812) | 261.57 (2615) |
| magnetization, | Y | 279.5 (2795) | 251 (2510) |
| Ir, mT (gauss) | Z | 262.8 (2628) | 174.3 (1743) |
| Hc % X/Z | | 1.9 | 14 |
| Ir % X/Z | | 6.5 | 33 |

The very low Hc% X/Z and Ir% X/Z values obtained with Element A14 demonstrate that magnetic recording elements that exhibit an isotropic response can be obtained using facetted nodular particles. In contrast, the corresponding values obtained with the element using acicular particles (B14) has very different coercivity values and remanent magnetization values in the three directions, particularly in the Z direction.

EXAMPLE 15

The undoped facetted nodular delta ferric oxide hydrate particles of Example 2 were converted to the corresponding gamma ferric oxide particles and metallic particles by the procedures of Examples 12 and 14, respectively. The resulting facetted, nodular magnetic particles had average particle diameters in the range of from 0.025 to 0.04 micrometers. Magnetic recording elements were prepared using the gamma ferric oxide particles according to the procedure of Example 12 and the metallic particles according to the procedure of Example 15. The coercivities of the magnetic layers in the X, Y, and Z directions were determined as described previously herein. The coercivities of the magnetic layers containing the facetted, nodular gamma ferric oxides in the X, Y and Z directions were substantially the same and all exceeded 15.12 kA/m(190 Oe). The coercivities of the magnetic layers containing the facetted, nodular metallic particles in the X, Y and Z directions were substantially the same and all exceeded 71.62 kA/m(900 Oe).

This invention has been described in detail with particular reference to preferred embodiments thereof, but it will be understood that variations and modifications can be effected within the spirit and the scope of the invention.

I claim:

1. A process for preparing facetted, nodular particles having at least six faces, said process comprising (a) adding an aqueous solution of ferrous salt to an aqueous solution of alkaline hydroxide while avoiding substantial local excesses of the ferrous salt, and subjecting the ferrous salt solution to reducing conditions to reduce ferric ion contaminants present therein to ferrous ions, before or during the addition thereof to the alkaline hydroxide solution, to thereby form an aqueous dispersion of ferrous hydroxide particles, and (b) oxidizing the ferrous hydroxide particles, to thereby form delta ferric oxide hydrate particles, the oxidizing being in the presence of an iron complexing agent that is soluble in the reaction medium and capable of selectively forming ferric ion complexes that are soluble in such reaction medium.

2. A process according to claim 1 wherein the iron complexing agent is added after precipitation of the ferrous hydroxide particles and prior to oxidizing such particles.

3. A process according to claim 1 wherein the iron complexing agent is pyrogallol, gallic acid, glutamic acid, tannic acid or mannitol.

4. A process according to claim 1 wherein the alkaline hydroxide is used in an amount up to a 100 percent stoichiometric excess.

5. A process according to claim 1 wherein the reducing conditions are provided by adding the aqueous solution of ferrous salt to the solution of alkaline hydroxide in the presence of a reducing agent.

6. A process according to claim 5 wherein the reducing agent is added to at least one of the solutions of ferrous salt or alkaline hydroxide.

7. A process according to claim 1 wherein the delta ferric oxide hydrate particles are dehydrated, reduced and oxidized to form magnetic iron oxide particles.

8. A process according to claim 1 wherein the delta ferric oxide hydrate particles are dehydrated and reduced to form magnetic metallic particles.

* * * * *